US008255629B2

(12) United States Patent  
Meyer et al.

(10) Patent No.: US 8,255,629 B2
(45) Date of Patent: Aug. 28, 2012

(54) METHOD AND APPARATUS WITH DATA STORAGE PROTOCOLS FOR MAINTAINING CONSISTENCIES IN PARALLEL TRANSLATION LOOKASIDE BUFFERS

(75) Inventors: Paul Gilbert Meyer, Bee Cave, TX (US); David James Williamson, Austin, TX (US); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 498 days.

(21) Appl. No.: 12/457,812

(22) Filed: Jun. 22, 2009

(65) Prior Publication Data

US 2010/0325358 A1 Dec. 23, 2010

(51) Int. Cl.
G06F 12/00 (2006.01)
G06F 13/00 (2006.01)
G06F 13/28 (2006.01)

(52) U.S. Cl. ...................................... 711/122
(58) Field of Classification Search .................. 711/122
See application file for complete search history.

(56) References Cited

U.S. PATENT DOCUMENTS

| 5,440,710 | A | * | 8/1995 | Richter et al. | 711/207 |
| 5,737,749 | A | | 4/1998 | Patel et al. | |
| 6,625,714 | B1 | * | 9/2003 | Lyon | 711/207 |
| 7,117,290 | B2 | * | 10/2006 | Shen et al. | 711/3 |
| 2004/0049635 | A1 | | 3/2004 | Park | |
| 2007/0174553 | A1 | | 7/2007 | Morrow et al. | |

FOREIGN PATENT DOCUMENTS

| GB | 2 426 082 | 11/2006 |
| KR | 1020000002037 | 1/2000 |

OTHER PUBLICATIONS

UK Search Report dated Sep. 16, 2010 for GB 1009937.2.

* cited by examiner

*Primary Examiner* — Yaima Campos
(74) *Attorney, Agent, or Firm* — Nixon & Vanderhye P.C.

(57) ABSTRACT

A storage apparatus receives a first and second access requests for accessing items in a same clock cycle. The apparatus includes two stores, each storing a subset of the plurality of items, the first access request being routed to a first store and the second access request to a second store; miss detecting circuitry for detecting a miss in the accessed store; item retrieving circuitry for retrieving an item whose access generated a miss from a further store; updating circuitry for selecting an item to overwrite in one of the two stores, the updating circuitry being responsive to the miss detecting circuitry detecting the miss in an access to the first or second store and to at least one further condition to update both of the two stores with the item retrieved from the further store by overwriting the selected items.

19 Claims, 4 Drawing Sheets

METHOD AND APPARATUS WITH DATA STORAGE PROTOCOLS FOR MAINTAINING CONSISTENCIES IN PARALLEL TRANSLATION LOOKASIDE BUFFERS

BACKGROUND OF THE INVENTION

1. Field of the Invention

The field of the invention relates to data storage apparatus and in particular to data storage apparatus that receive multiple access requests per clock cycle.

2. Description of the Prior Art

Data processors process ever larger amounts of data that require significant storage capacity. Large data stores such as memory take time to access. Thus, techniques have evolved to store a subset of the data that may be required by a processor in smaller data stores such as low level caches that are easy to access, with access to one or more larger stores such as higher level caches or memory being made if data not within the subset is required.

The smaller data stores are made easy to access to improve processor speeds, however, they are costly to implement in power and area and it is therefore important that they store items that it is likely that the processor will require. If they do not store the required data then they simply add area and drain power without adding benefit. In effect the hit rate in these data stores is very important to processor power consumption and performance.

One example of such data stores are translation look aside buffers or TLBs. Most modern microprocessors with virtual memory have a virtually addressed, physically mapped data cache. Thus, all memory reads and writes need to have their virtual addresses translated to physical addresses before the addressed storage location can be accessed. This translation is typically done by a small translation cache called a TLB. If the TLB does not contain the requested translation, the translation information must be retrieved from a backing level 2 TLB or from memory management logic that accesses the page tables in memory. Hit rates in these TLBs are very important to processor performance. Even with a backing L2 TLB the penalty for TLB misses has a significant effect on overall performance.

Many modern microprocessors can issue two memory accesses per cycle, one load and one store and these therefore need two TLBs or a dual ported TLB to do the translations. A dual ported TLB has approximately the same area as the two TLB solution and may actually be implemented as two TLBs. The dual ported TLB has the disadvantage that in effect each entry is stored twice. The use of two independent TLBs which can each store different entries has the advantage of being able to store more entries than the dual ported TLB and can therefore provide better performance, in situations where the two TLBs are accessing different regions of memory.

However, there are several instances where load and stores will be to the same data items and if these have not been accessed recently then there will be a miss in both the load TLB and the store TLB in the two TLB implementation. Thus, there will be a time penalty for both of these accesses. In the dual ported TLB clearly the load TLB would have stored the data making it available for the store TLB.

Thus, these two implementations both have disadvantages.

It would be desirable to be able to provide a system with at least some of the advantages of both the dual ported and the independent storage mechanisms.

SUMMARY OF THE INVENTION

A first aspect of the present invention provides a storage apparatus for storing a plurality of items, said storage apparatus being configured to receive a first access request and a second access request for accessing respective items in a same clock cycle, said storage apparatus comprising: two stores each for storing a subset of said plurality of items, said first access request being routed to a first store and said second access request to a second store; miss detecting circuitry for detecting a miss where a requested item is not stored in said accessed store; item retrieving circuitry for retrieving an item whose access generated a miss from a further store; updating circuitry for selecting an item to overwrite in a respective one of said two stores in dependence upon an access history of said respective store, said updating circuitry being responsive to said miss detecting circuitry detecting said miss in an access to said first store and to at least one further condition to update both of said two stores with said item retrieved from said further store by overwriting said selected items.

The present invention recognises that when two access requests are occurring in a same clock cycle they may be related and as such, it may be advantageous to provide some linkage between the two data stores that they are accessing while allowing each data store to store data independently as well. Thus, the present invention provides updating circuitry that is responsive to a miss and to at least one further condition to update both of the stores with the retrieved item by overwriting selected items. These items are selected based on the access history of the actual data store and thus items that have not been accessed recently can be overwritten independently in each store. Thus, if one of the first access requests accesses an item that the second access requests will not need, this item will be stored in the second data store but will not be used and as such the update circuitry will soon select it for overwriting. If however, the two access requests are accessing common items then items accessed by the first access requests will be required by at least some of the second access requests and their storage in the second data store will have provided some benefit.

In some embodiments, said updating circuitry is configured to identify if said item generating said miss is stored in said second store, said at least one further condition being detection that said item is not stored in said second store.

The updating circuitry may identify if the item that generated the miss in the first store is stored in the second store. If it is not stored in the second store then this is the at least one further condition and means that the updating circuitry will update both the first and the second store with the retrieved item by overwriting the selected items, the items being selected in response to their access history.

In other embodiments, said updating circuitry is responsive to detecting that said item generating said miss is present in said second store to retrieve said item from said second store and to copy said item to said first store by overwriting said item selected by said updating circuitry.

Where the item generating the miss is present in the second store then in some embodiments this item is retrieved from the second store and copied to the first store in a position selected by the updating circuitry. This may be advantageous where fetching the item from the further store would require many clock cycles. This may occur where the further store is a store that is difficult to access such as off chip memory.

In other embodiments, said updating circuitry is responsive to detecting said item generating said miss is present in said second store to select said item for overwriting and to select an item for overwriting in said first store in dependence upon a history of item accesses of said store, said updating circuitry being configured to overwrite said selected items with said items retrieved from said further store.

If the further store is not remote and difficult to access then it may be simpler just to fetch the data item from the further store as is performed in other situations and to overwrite this item with the value fetched in the second store and to write it to the first store in a position selected by the updating circuitry based on access history. Although the value fetched should be the same value as that stored in the second store, it may be advantageous to overwrite the value as it will guarantee that the two data stores never contain different translations or attributes for the same item. Although software should prevent this from ever happening validation efforts can be decreased by always overwriting the entry in this case.

In other embodiments this entry is not overwritten in the second store, it is simply left as it is and no item is written to the second store, and the retrieved item is written to the first data store at a place selected by the updating circuitry.

In some embodiments, said item retrieved from said further store has attribute data indicative of an attribute of said data associated with it, said at least one further condition comprising said attribute data, said updating circuitry being responsive to said attribute data not having a predetermined value to update said second store and said first store with said retrieved item and to said attribute data having said predetermined value to not update said second store with said retrieved item and to update said first store with said retrieved item.

In some instances the items stored may have attribute information associated with them. It may be advantageous to use this information when deciding whether or not to update an item.

For example if said first access request is a load (memory read) request and said second access request is a store (memory write) request and said predetermined value is a value indicating said data associated with said value is read only data, then in this case, it is clear that the retrieved item will never be used in the store (memory write) pipeline and as such, it should not be written to the second store which is in this pipeline. Thus, using this further information can improve the efficiency of the device by not overwriting items that may be needed in the second store with items that it is known will never be needed.

In some embodiments, said two stores comprise two level 1 caches and said storage apparatus further comprises said further store, said further store comprising a level 2 cache.

Embodiments of the present invention are particularly useful for caches which are data stores that are easy and cheap to access and which can only store a small amount of data owing to their area and power overheads. Level 1 caches are the easiest and quickest to access with level 2 caches generally being larger and consuming more time to access. Thus, it may be advantageous to have store 1 and store 2 as level 1 caches storing a subset of data and further data items being stored in a level 2 or L2 cache. In other embodiments rather than having an L2 cache for the further data, the further data may be stored in memory and a memory management unit would be required to access this data.

In some embodiments, said updating circuitry comprises a buffer for storing an access history for each of said two stores and said updating circuitry is configured to select an item for overwriting that has not been accessed recently.

When selecting which item to overwrite the updating circuitry relies on an access history for that store. Thus, in some embodiments it comprises a buffer that stores an access history for each of the two stores and the updating circuitry uses this data to select an item for overwriting that has not been accessed recently. In this way, items that have not been used for a while are overwritten. Thus, if items are written to a store that are items required by the other store and are not used in this store, they will be quickly overwritten as their access history indicates that they are not being accessed.

In some embodiments, said access requests identify storage locations of said items using virtual addresses, and said two stores comprise translation lookaside buffers each storing a plurality of translations of virtual to physical addresses.

Embodiments of this present invention are particularly useful for translation lookaside buffers. As noted in the introduction translation lookaside buffers are used to convert virtual addresses output by a processor to physical addresses which identify storage locations in the caches and memory. These translation lookaside buffers are generally caches and store a subset of the translation information. It is important that misses occur in these as little as possible as these generate a large overhead in processing time. Embodiments of the current invention provide a way of providing two lookaside buffers that can store independent items but are linked so that if one of them requires an item, that item is also written in the other one. This means that in situations where the processor is for example reading and writing to the same page relatively close in time then a first load to a page will ensure that it is stored in the data store on the write path ready for the write to that page. As the items that are selected to be overwritten are selected independently for each store based on their access history, if an item is written to one of the data stores that is not required, it will be quickly overwritten.

It should be noted that the items stored may simply be the translations of virtual to physical addresses, or they may alternatively include additional information such as attribute data relating to the attributes of items stored at the physical address.

In some embodiments, said storage apparatus comprises at least one additional store, said storage apparatus being configured to receive at least one additional access request in a same clock cycle as said first and second access request, said at least one additional access request being routed to said at least one additional store, said updating circuitry being configured to select an item to overwrite in said at least one additional store in dependence upon an access history of said at least one additional store, said updating circuitry being responsive to said miss detecting circuitry detecting said miss in an access to said first store and to said at least one further condition to update all of said stores with said item retrieved from said further store by overwriting said selected items.

Although embodiments of the invention have been discussed for two access requests in a single cycle and two data stores, it should be clear to a skilled person that it would apply equally well for further access requests in the same cycle with the use of additional data stores. In such a circumstance any miss in any of the data stores will cause the retrieved data to be stored in all of them, if the further conditions are also met.

A second aspect of the present invention provides a data processing apparatus comprising a processor for processing data and a storage apparatus according to a first aspect of the present invention, wherein said processor is configured to generate a data load request and a data store request during a same clock cycle.

Where the two access requests are load and store requests it is particularly advantageous to have stores that are linked as often a processor may read and write to the same item relatively close in time. In such a case if the stores are not linked then a first load to an item causes the processor to stall while the miss is processed and a short time later the processor will stall again when the first store to the same item occurs. By storing the data retrieved during the load in the data store for the write pipeline the second stall is avoided.

In some embodiments, said data processing apparatus comprises said further store, said further store being configured to store attribute data in association with each item.

Items may be stored in the further store in locations identified by physical addresses. These items may for example, be data items to be processed by a processor or instructions for controlling the processor. These physical addresses may have attribute data associated with them, this attribute data providing an indication of an attribute of the item that is stored in that address. These attributes may include things such as whether or not the item is cacheable, and/or whether it is a read only or write only item.

A third aspect of the present invention provides a method of updating items stored in a first and second store comprising the steps of: receiving a first access request to access a first item in said first store and a second access request for accessing a second item in a second store in a same clock cycle; determining if either access request generates a miss where a requested item is not stored in said accessed store; retrieving an item whose access generated a miss from a further store; selecting an item to overwrite in a respective one of said two stores in dependence upon an access history of said respective store; in response to detecting said miss in an access to said first store and to at least one further condition updating both of said two stores with said item retrieved from said further store by overwriting said selected items.

A fourth aspect of the present invention provides a storage means for storing a plurality of items, said storage means being configured to receive a first access request and a second access request for accessing respective items in a same clock cycle, said storage means comprising: two stores each for storing a subset of said plurality of items, said first access request being routed to a first store and said second access request to a second store; miss detecting means for detecting a miss where a requested item is not stored in said accessed store; item retrieving means for retrieving an item whose access generated a miss from a further store; updating means for selecting an item to overwrite in a respective one of said two stores in dependence upon an access history of said respective store, said updating means being responsive to said miss detecting means detecting said miss in an access to said first store and to at least one further condition to update both of said two stores with said item retrieved from said further store by overwriting said selected items.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
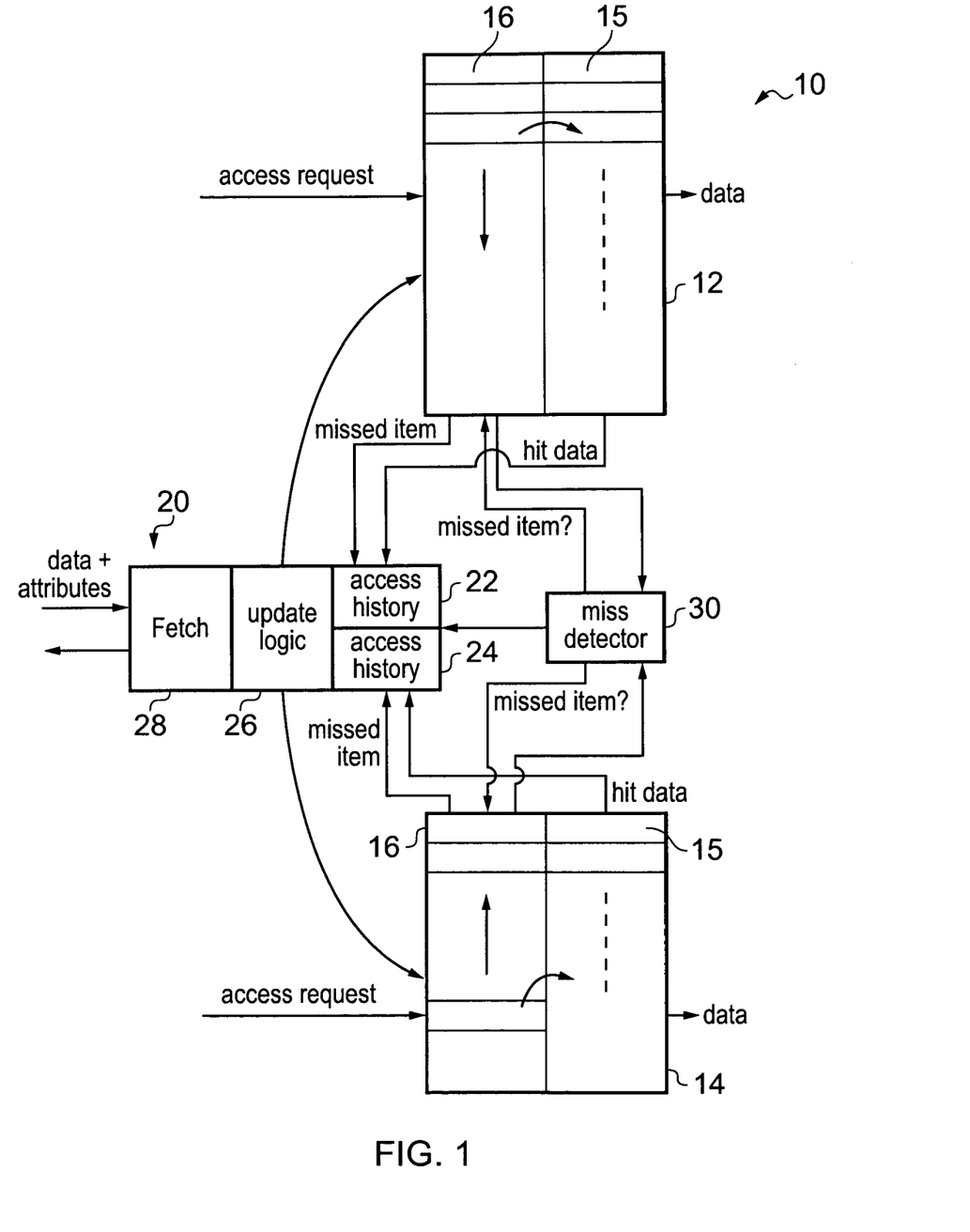
FIG. 1 shows a data storage apparatus according to an embodiment of the present invention.

FIG. 1 shows a storage apparatus 10 according to an embodiment of the present invention. This storage apparatus comprises two data stores 12 and 14 that comprise a plurality of data items 15 and their corresponding addresses 16. These two data stores are arranged in parallel and each receive an access request during a same clock cycle. These access requests are access requests for data and specify the storage location of this data using an address. Thus, the specified address is compared with the address 16 and if it matches the data is output.

As well as outputting the data, hit data indicating that there has been an access to this storage location is sent to circuitry 20. Circuitry 20 comprises two access history buffers 22 and 24 for each data store 12 and 14. These store the access history of the data stores 12 and 14. If one or both of the access requests does not find the required data in the accessed data store 12, 14 then this is detected using miss detector 30. Miss detector 30 then looks for the missed item in the other data store 14, 12. It then signals to the update logic within circuitry 20 that there has been a miss in the respective data store and it also signals whether or not the missed item is in the other data store and if it is its location.

Update circuitry then signals to fetch circuitry 28 to fetch the missed data item and fetch circuitry 28 then sends a signal to an additional data store at a remote location and retrieves the required data item.

In this embodiment the data item is stored in this remote data store in a location identified by an address. This storage location has attribute data associated with it indicating the attributes of the item stored at this address. Examples of attributes that might be associated with a data item, are permissions, such as read, write, or not accessible, these permissions might have further restrictions such as who is allowed to access the data item, for example access may be restricted to a user, or an administrator. Further attributes may include such things as cacheable, execute never or a device indicator. Thus, these attributes provide further information about the data item and may be used by the update logic to determine if it is appropriate to store the data item in a particular data store. This attribute data may be retrieved and stored with the data item in the data stores.

Thus, update logic 26 selects a location for this data item to be stored in, in the data store where the miss occurred using the access history of that data store to determine a storage location that has not been accessed recently. The update circuitry 26 then looks at the attribute data to see if this indicates whether the storage of this data item in the other data store is likely to be useful or not. For example, if the attribute of the data item indicates that the data item is read only data, then if the other data store is a data store on a write pathway, it is better not to overwrite an item stored in this data store with this read only data item. If the attribute data does not deter the writing of the data item into the other data store then the update circuitry 26 selects a storage location to write that data item to. Firstly it will look at the data that the miss detector sent it, to see if that data item was stored in that data store before. If it was then it will select this location to write the data to. If it was not then it will select a storage location from the access history stored in the access history buffer. It should be noted that although in this embodiment if the data item that was missed is in the other data store it is overwritten, in other embodiments it may be that this data is simply left as it is in the data store and this data item is not written to the data store. Clearly not writing it to the data store has some power saving advantages, while writing it to the data store will have the advantage that if for some reason the copy of that data item has changed in some way then the most current value is written.

Figure 2:
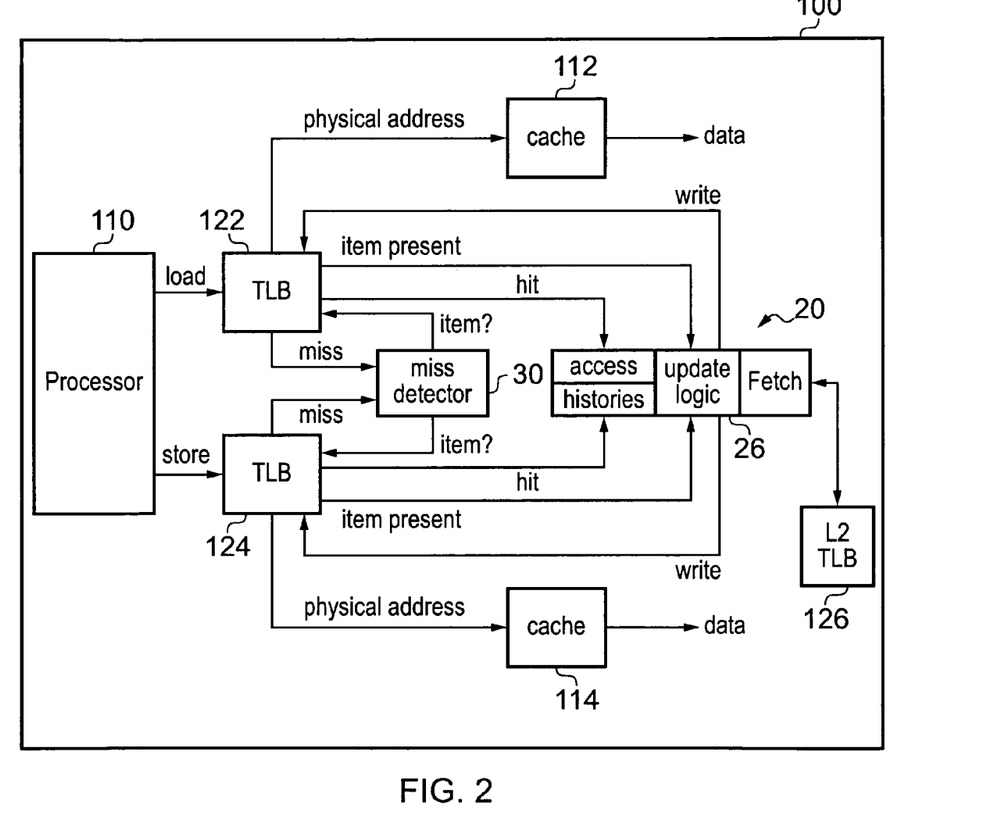
FIG. 2 shows a data processing apparatus with caches accessed using TLB's according to an embodiment of the present invention.

FIG. 2 shows a data processing apparatus 100 according to an embodiment of the present invention. This comprises a processor 110 and caches 112 and 114 which are physically addressed caches. It should be noted that although these are shown as two caches, they may in some embodiments be a single cache with a read and write port. The processor has a load and store pipeline that operate in parallel and thus, there is a load request and a store request that are sent during the same clock cycle. These requests use virtual addresses and thus, in order to access the data items from the caches these need to be converted into physical addresses. This is done using TLBs 122 and 124. Thus, a load request and a store request are sent at the same time to the respective TLBs and it is determined whether the address specified is stored therein or not. If it is not, this is detected using miss detector 30 and the miss detector 30 looks in the other TLB to see if the item is stored in there. If, however, the address specified is present then this hit information is sent to the access history buffers associated with each TLB in circuitry 20. At the same time the physical address found from the virtual address is sent to the cache.

If one or both of the TLB's generated a miss then update logic 26 determines from the information received from the miss detector if the required item is in the other TLB or not. The item is fetched from an L2 cache 126 which stores additional address translation information. This returns the required information and update logic 26 then determines from miss detector 30 if the item was in the other TLB. If it was then this TLB is not updated and the TLB generating a miss is updated with the retrieved item, an item for overwriting being selected from the access history. If it was not then the update logic determines from the respective access history buffers where this data item should be stored in both TLBs 122 and 124. It selects the item that has been used least recently to overwrite. In this way, although a data item is written into each of the TLBs as different data items were selected to be overwritten based on their access histories the two TLBs do not contain the same data items at the same time. However, as a miss in one of the TLBs will cause an address translation to be stored in the other TLB, if the processor is reading and writing to the same page tables as occurs from time to time then a stall in the load pipeline in response to a miss will not be followed by a stall in the store pipeline as the required page table will have been written into the TLB on the store pipeline. If they are accessing different page tables then the information stored in one TLB in response to a miss in the other will not used and will be quickly overwritten, as the overwriting algorithm uses access history to select an item to overwrite.

Figure 3:
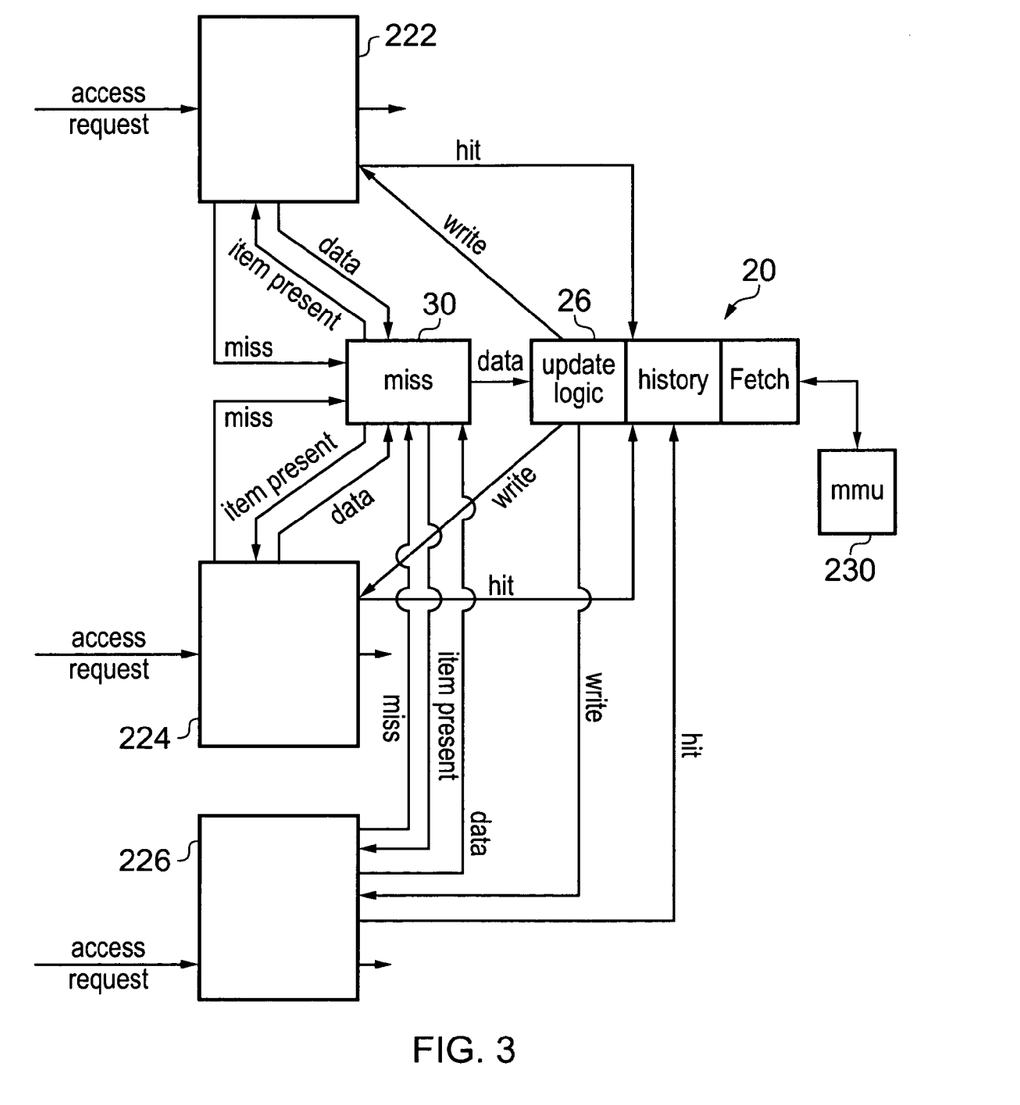
FIG. 3 shows a storage apparatus where multiple access requests are received in a single clock cycle.

FIG. 3 shows a data storage apparatus according to an embodiment of the present invention. In this apparatus there are three data access requests that occur in parallel to three parallel data stores 222, 224 and 226. In a similar way to the previous circuitry miss detector 30 detects if there is a miss in any of the data stores and if there is determines if the item is present in any of the other data stores. It then sends this information to update logic 26. If there isn't a miss then information that there was a hit is sent to the circuitry 20 where it is stored in the history buffers 22 and 24 related to the respective data store. Update logic 26 then determines from the information from the miss circuitry 30 if the required data item was present in any of the other data stores. If it was then it copies that data from that data store to the other data stores and selects the locations to overwrite in the data stores from the information in the respective history buffers 22. If the data item was not present in any of the other data stores then it fetches the data in this example from a memory management unit 230. It should be noted that in this embodiment as the further data store is not a level 2 cache but is actually something managed by the memory management unit then it does take significant extra time to retrieve the data. Thus, if the data item that is not present in one of the data stores is present in one of the others it is advantageous to copy it from this data store to the other data stores. If the data item is not present in any of the data stores then it is fetched using the memory management unit 230 and is written into each of the data stores, the item to be overwritten in each of the data stores being selected in dependence upon the access history determined from the respective history buffer 22.

Figure 4:
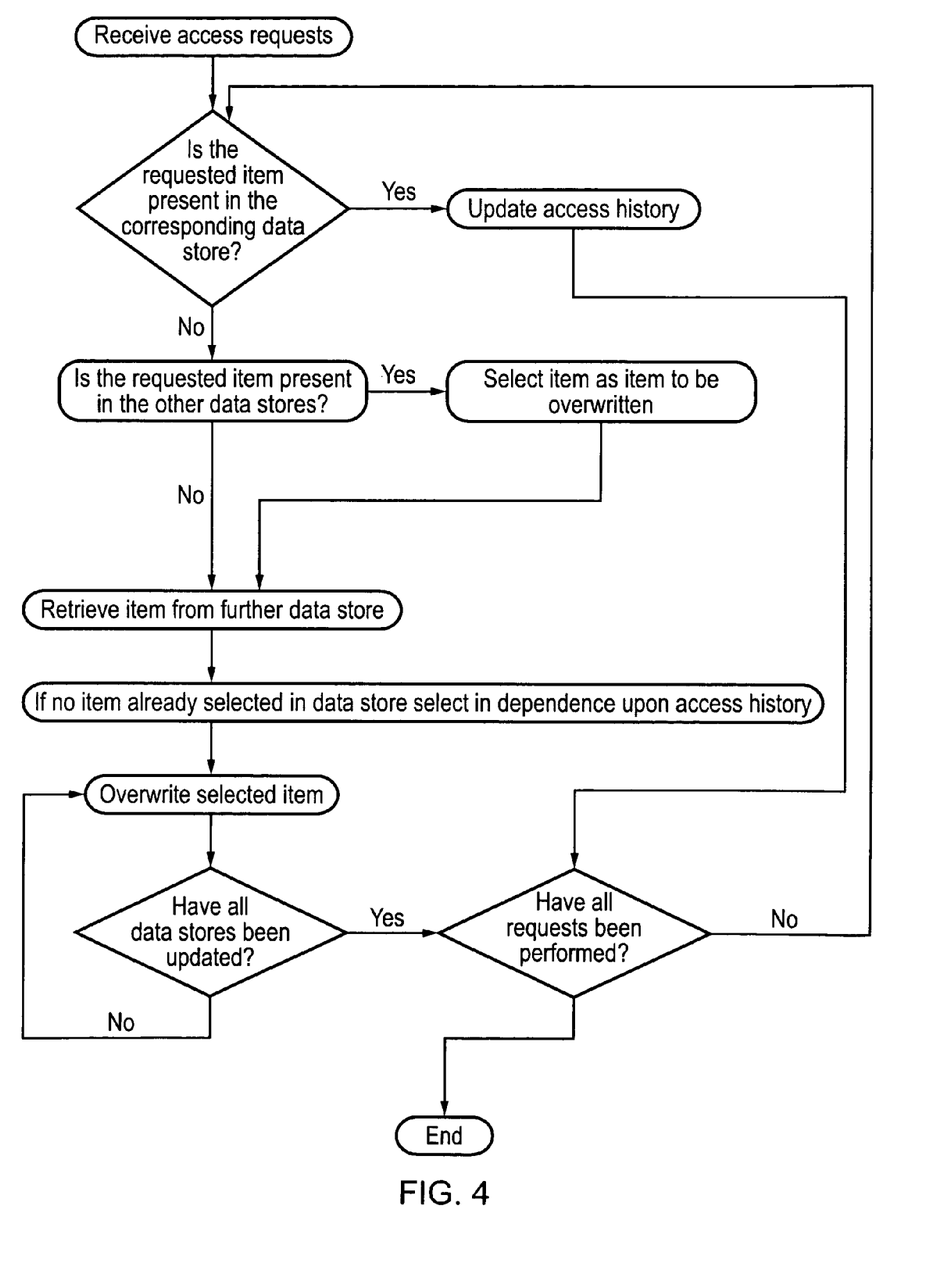
FIG. 4 shows a flow diagram illustrating a method according to an embodiment of the present invention.

FIG. 4 shows a flow diagram illustrating a method according to an embodiment of the present invention. Initially plural access requests are received and it is determined if the item requested is present in the corresponding data store. If it is then the access history for that data store is updated and it is determined whether all accesses requested have been performed.

If it is not in the corresponding data store then it determines if the item requested is in any of the other data stores. If it is then this item is selected as the item to be overwritten in that particular data store. The item is then retrieved from a further data store. The item to be overwritten in each data store is then selected depending upon their access history if it has not already been selected in the previous steps. The selected item is then overwritten and it is determined if all data stores have been updated. If they have then it is determined if all access requests have been performed. If not then it goes back to determining if the item requested is in the corresponding data store. If they have all been performed then that is the end of the process for the updating circuitry.

This is just one method of performing the data accesses and it should be clear that as discussed previously if the item requested is in one of the other data stores then rather than selecting it as the item to be overwritten it can just be left and no item is overwritten in that data store, or alternatively it could be copied from that data store to the other data stores rather than being retrieved from a further data store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A storage apparatus for storing a plurality of items, said storage apparatus being configured to receive a first and second access requests for accessing respective items in a same clock cycle, said storage apparatus comprising:

first and second stores, each store for storing a subset of said plurality of items, said first access request routed to said first store and said second access request routed to said second store;

miss detecting circuitry configured to detect and generate a miss where a requested item is not stored in one of said stores;

item retrieving circuitry configured to retrieve said requested item from a further store;

updating circuitry configured to select an item to overwrite in a respective one of said first and second stores in dependence upon an access history of said respective store, said updating circuitry is responsive to:

said miss detecting circuitry detecting said miss in an access to said first store and to at least one further condition to update said first and second stores with said requested item retrieved from said further store by overwriting said selected items; and said miss detecting circuitry detecting said miss in an access to said second store and to said at least one further condition to update said first and second stores with said requested item retrieved from said further store by overwriting said selected item.

2. A storage apparatus according to claim 1, wherein said updating circuitry is configured to identify if said requested item is stored in an other of said first and second stores, said at least one further condition being detection that said item is not stored in said other of said first and second stores.

3. A storage apparatus according to claim 2, wherein said updating circuitry, responsive to detecting that said requested item is present in said other of said first and second stores, is configured to retrieve said item from said other of said first and second stores and to copy said item to said one of said first and second stores by overwriting said item selected by said updating circuitry.

4. A storage apparatus according to claim 2, wherein said updating circuitry is responsive to detecting said requested item is present in said other of said first and second stores, to select said item for overwriting and to select an item for overwriting in said one of said first and second stores in dependence upon a history of item accesses of said store, said updating circuitry being configured to overwrite said selected items with said items retrieved from said further store.

5. A storage apparatus according to claim 2, wherein said updating circuitry is responsive to detecting said requested item is present in said other of said first and second stores to not overwrite any item in said other of said first and second stores and to select an item for overwriting in said one of said first and second stores in dependence upon a history of item accesses of said one of said first and second stores and to overwrite said selected item.

6. A storage apparatus according to claim 1, wherein said requested item retrieved from said further store has attribute data indicative of an attribute of said data associated with it, said at least one further condition comprising said attribute data not having a predetermined value, said updating circuitry being responsive to said attribute data not having said predetermined value to update said second store and said first store with said retrieved item and to said attribute data having said predetermined value to not update said other of said first and second stores with said retrieved item and to update said one of said first and second stores with said retrieved item.

7. A storage apparatus according to claim 6, wherein said first access request is a store request and said second access request is a load request, said one of said first and second stores comprises said first store, and said predetermined value is a value indicating said data associated with said value is read only data.

8. A storage apparatus according to claim 1, said two stores comprising two level one caches and said storage apparatus further comprising said further store, said further store comprising a level two cache.

9. A storage apparatus according to claim 1, wherein said updating circuitry comprises a buffer for storing an access history for each of said two stores and said updating circuitry is configured to select an item for overwriting that has not been accessed recently.

10. A storage apparatus according to claim 1, wherein said access requests identify storage locations of said items using virtual addresses, and said two stores comprise translation lookaside buffers each storing a plurality of translations of virtual to physical addresses.

11. A storage apparatus according to claim 1, said storage apparatus comprising at least one additional store, said storage apparatus being configured to receive at least one additional access request in a same clock cycle as said first and second access request, said at least one additional access request being routed to said at least one additional store, said updating circuitry being configured to select an item to overwrite in said at least one additional store in dependence upon an access history of said at least one additional store, said updating circuitry being responsive to said miss detecting circuitry detecting said miss in an access to said first store and to said at least one further condition to update all of said stores with said item retrieved from said further store by overwriting said selected items.

12. Data processing apparatus comprising a processor for processing data and a storage apparatus according to claim 1, wherein said processor is configured to generate a data load request and a data store request during a same clock cycle.

13. A data processing apparatus according to claim 12, said data processing apparatus comprising said further store, said further store being configured to store attribute data in association with each item.

14. A method of updating items stored in a first and second store comprising the steps of:
  receiving first and second access requests for accessing a first item in said first store and a second item in said second store in a same clock cycle;
  determining if a requested item is not stored in one of said stores and generating a miss where a requested item is not stored in said one of said stores;
  retrieving said requested item from a further store;
  selecting an item to overwrite in a respective one of said first and second stores in dependence upon an access history of said respective store; and
  an updating step:
    in response to detecting said miss in an access to said first store and to at least one further condition, updating said first and second stores with said requested item retrieved from said further store by overwriting said selected items: and
    in response to detecting said miss in an access to said second store and to said at least one further condition, updating said first and second stores with said requested item retrieved from said further store by overwriting said selected item.

15. A method according to claim 14, comprising a further step of identifying if said requested item is stored in said other of said first and second stores, said at least one further condition being detection that said first item is not stored in said other of said first and second stores.

16. A method according to claim 15, wherein in response to detecting said requested item is present in said other of said first and second stores;
  selecting said item for overwriting;
  selecting an item for overwriting in said one of said first and second stores in dependence upon a history of item accesses of said store; and
  updating both of said first and second stores with said item retrieved from said further store by overwriting said selected items.

17. A method according to claim 15, wherein in response to detecting said requested item is present in said other of said first second stores:

not overwriting any item in said other of said first and second stores; and selecting an item for overwriting in said first and second stores in dependence upon a history of item accesses of said first and second stores and overwriting said selected item in said one of said first and second stores.

18. A method according to claim 14, comprising in response to detecting that said requested item is present in said other of said first and second stores:

retrieving said item from said other of said first and second stores; and copying said item to said first store by overwriting said item selected by said updating circuitry.

19. A storage apparatus for storing a plurality of items, said storage apparatus configured to receive first and second access requests accessing respective items in a same clock cycle, said storage apparatus comprising:

first and second stores, each of said stores comprising means for storing a subset of said plurality of items, said first access request being routed to said first store and said second access request routed to said second store;

miss detecting means for detecting and generating a miss where a requested item is not stored in said stores;

item retrieving means for retrieving said requested item from a further store;

updating means for selecting an item to overwrite in a respective one of said first and second stores in dependence upon an access history of said respective store, said updating means being responsive to:

said miss detecting means detecting said miss in an access to said first store and to at least one further condition to update said first and second stores with said item retrieved from said further store by overwriting said selected items; and said miss detecting means detecting said miss in an access to said first store and to said at least one further condition to update said first and second stores with said item retrieved from said further store by overwriting said selected items.

* * * * *